United States Patent
Berger et al.

[11] Patent Number: 6,047,451
[45] Date of Patent: Apr. 11, 2000

[54] BELT SHORTENING DEVICE

[75] Inventors: Russell Berger, Needham, Mass.; Stephen C. Berger, Naples, Fla.

[73] Assignee: Constance F. Berger, Naples, Fla.

[21] Appl. No.: 09/315,319

[22] Filed: May 20, 1999

[51] Int. Cl.[7] .......................... A44B 21/00; B25B 25/00
[52] U.S. Cl. ...................... 24/685 B; 24/909; 24/68 CD
[58] Field of Search .............. 24/68 CD, 68 E, 24/68 R, 685 B, 71.1, 715 T, 71.2, 909, 910, 269; 254/213, 218, 217, 223; 244/378.1, 378.2; 410/97, 100, 103

[56] References Cited

U.S. PATENT DOCUMENTS

| | | | |
|---|---|---|---|
| 482,035 | 9/1892 | Buckingham | 24/909 X |
| 547,760 | 10/1895 | Bicle | 24/909 X |
| 799,767 | 9/1905 | Weisenborn | 24/909 X |
| 3,574,342 | 4/1971 | Berns . | |
| 3,749,366 | 7/1973 | Brucker | 24/68 CD |
| 4,510,652 | 4/1985 | van Iperen . | |
| 4,604,773 | 8/1986 | Weber et al. | 24/71.2 |
| 4,823,443 | 4/1989 | Waters . | |
| 4,860,606 | 8/1989 | Rousseau | 24/68 R X |
| 4,913,608 | 4/1990 | Royball | 410/103 |
| 4,922,582 | 5/1990 | Fanigan . | |
| 5,103,536 | 4/1992 | Kamper . | |
| 5,426,827 | 6/1995 | Tracy et al. . | |

*Primary Examiner*—James R. Brittain
*Assistant Examiner*—Robert J. Sandy
*Attorney, Agent, or Firm*—Barlow, Josephs & Holmes, Ltd.

[57] ABSTRACT

A belt shortening device for winding and unwinding a vehicle seat belt is disclosed. The device includes a spindle mounted in a frame and connected to a crank arm to facilitate winding. The spindle includes a longitudinally extending slot which communicates with a laterally extending entry opening. A seat belt, when folded, is insertable into the longitudinally extending slot via the laterally extending entry opening. Once the vehicle seat belt is positioned within the longitudinally extending slot, the crank arm is manipulated to, thereby, rotate the spindle to wind the belt therearound. The laterally extending entry opening is positioned substantially mid-way along the length of the longitudinally extending slot to prevent ejection and slippage of the belt during winding.

4 Claims, 3 Drawing Sheets

BELT SHORTENING DEVICE

BACKGROUND OF THE INVENTION

1. Field of the Invention

This invention relates to a belt shortening device useful, for example, in tightening an automotive lap seat belt.

2. Description of the Prior Art

The known belt or strap shortening devices are typically overly complex and thus not suited for low cost manufacture. Moreover, such devices are not readily applicable to straps or belts that are either endless or that have buckles or the like that prevent threading through or around winding components. Thus, and particularly with respect to the automotive after market, there is a need for a low cost belt shortening device that can be readily applied to existing lap seat belts, thereby enabling the belts to be adequately tightened, for example, when securing a child's seat or the like in place on a vehicle seat.

SUMMARY OF THE INVENTION

A belt shortening device in accordance with the present invention includes a frame supporting a winding spindle which is rotatable by means of an operating arm. Spindle rotation is governed by ratchet mechanisms mechanically interposed between the operating arm and the spindle, and between the spindle and the frame. The spindle has a longitudinally extending slot communicating with a laterally extending entry opening. The entry opening is configured and dimensioned to accommodate lateral insertion of a folded belt into the spindle slot. Once the belt is thus inserted, the operating arm is employed to wind the belt around the spindle.

When the operating arm is rotated in the "wind" direction, the ratchet mechanisms act in concert to lock the arm to the spindle while allowing the spindle to rotate relative to the frame. When the arm rotates in the opposite "reset" direction, the ratchet mechanisms again act in concert to lock the spindle against rotation relative to the frame while allowing the arm to rotate freely with respect to the spindle.

These and other features and advantages of the present invention will be described in greater detail with reference to the accompanying drawings, wherein:

DETAILED DESCRIPTION OF PREFERRED EMBODIMENTS

Figure 1:
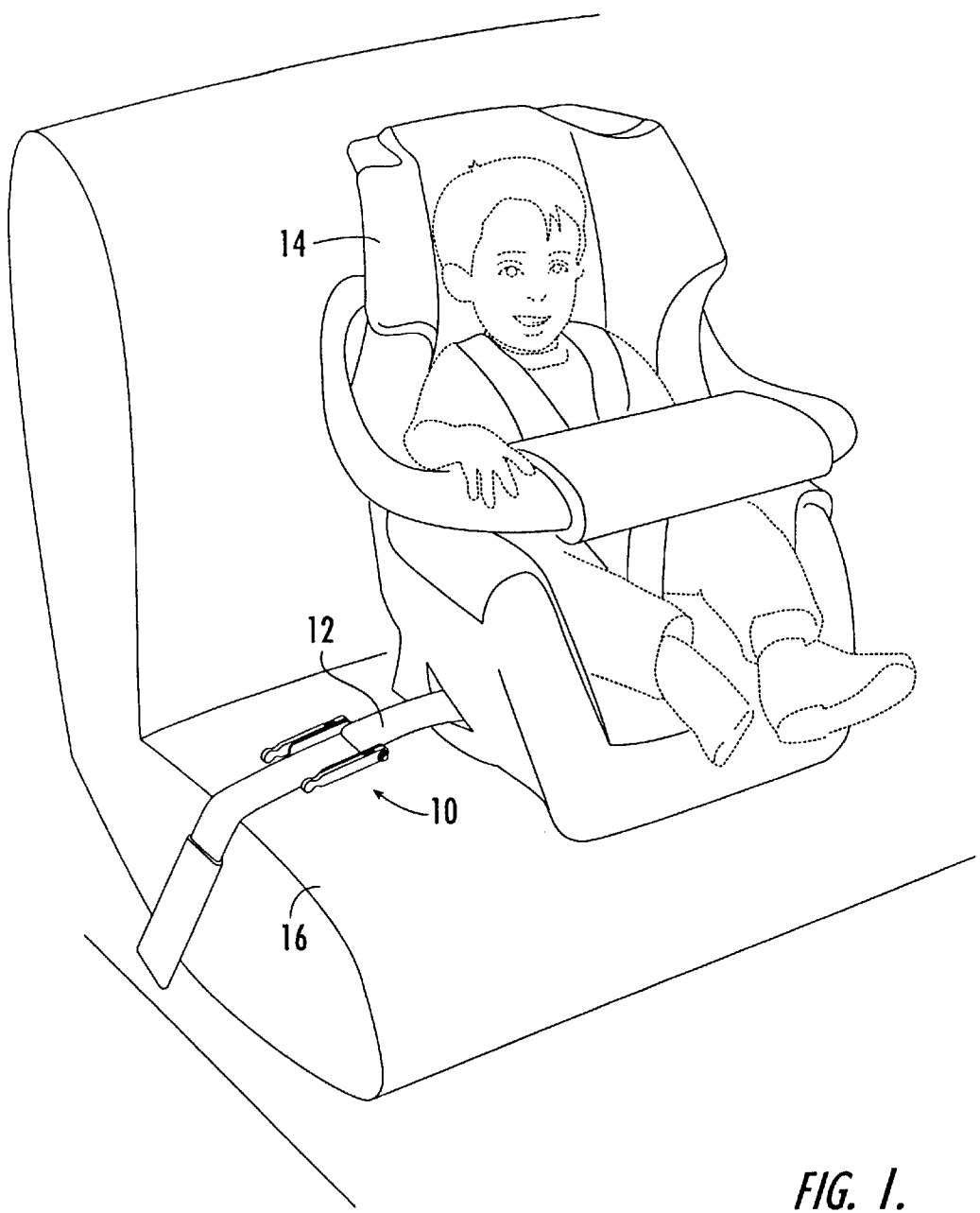
FIG. 1 is a perspective view showing a shortening device in accordance with the present invention applied to an automotive lap seat belt, the latter being used to hold a child's seat in place.
Figure 2:
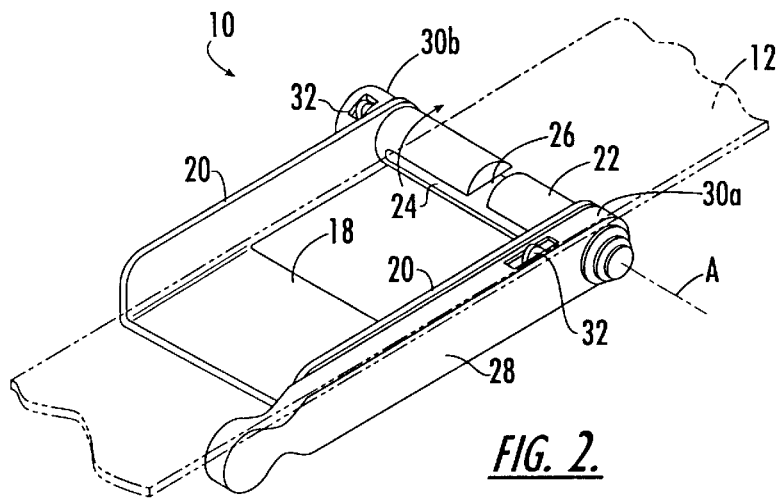
FIG. 2 is a perspective view on an enlarged scale of the shortening device shown in FIG. 1.

Referring initially to FIG. 1, a belt shortening device in accordance with the present invention is shown at 10 applied to an automotive lap seat belt 12. As illustrated, the seat belt 12 is shown in a tightened condition securing a child's seat 14 in place on an automobile seat 16.

Referring additionally to FIGS. 2–7, it will be seen that the shortening device 10 includes a generally channel-shaped frame comprising a bottom wall 18 and parallel opposed side walls 20. A winding spindle 22 extends between and is supported by the side walls 20 for rotation about an axis A. The winding spindle has a longitudinally extending slot 24 communicating with a laterally extending entry opening 26. The width of entry opening 26 is less than the length of slot 24.

An operating handle 28 is connected to the winding spindle 22 by means of a conventional ratchet mechanism 30a mechanically interposed therebetween, and a second ratchet mechanism 30b is mechanically interposed between the spindle 22 and an adjacent frame wall 20. When the arm 28 is operated in the "wind" direction W, ratchet mechanism 30a locks the arm to the spindle 22, and ratchet mechanism 30b allows the spindle to rotate with respect to the frame. When the arm is operated in the opposite reset direction "R", ratchet mechanism 30b locks the spindle to the frame, and ratchet mechanism 30a allows the arm to rotate relative to the spindle. Latches 32 provides a means of reversing the operation of the ratchet mechanisms.

Figure 3:
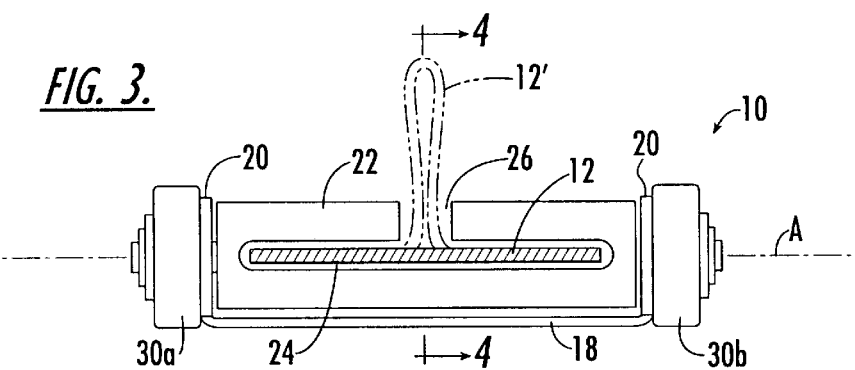
FIG. 3 is an end view of the shortening device taken along line 3—3 of FIG. 2.
Figure 4:
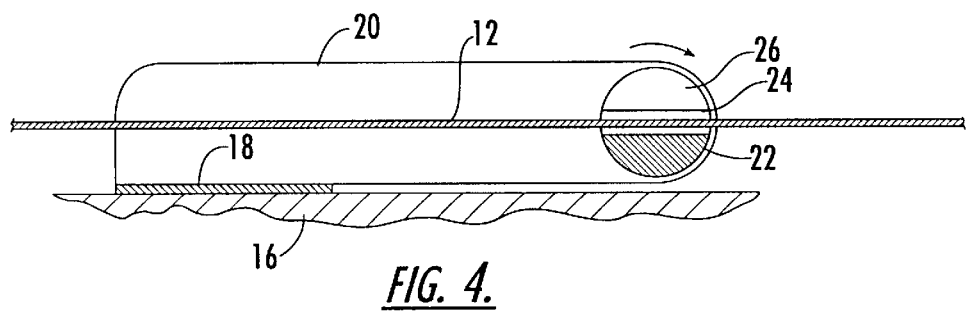
FIG. 4 is a sectional view taken along line 4—4 of FIG. 3.
Figure 5:
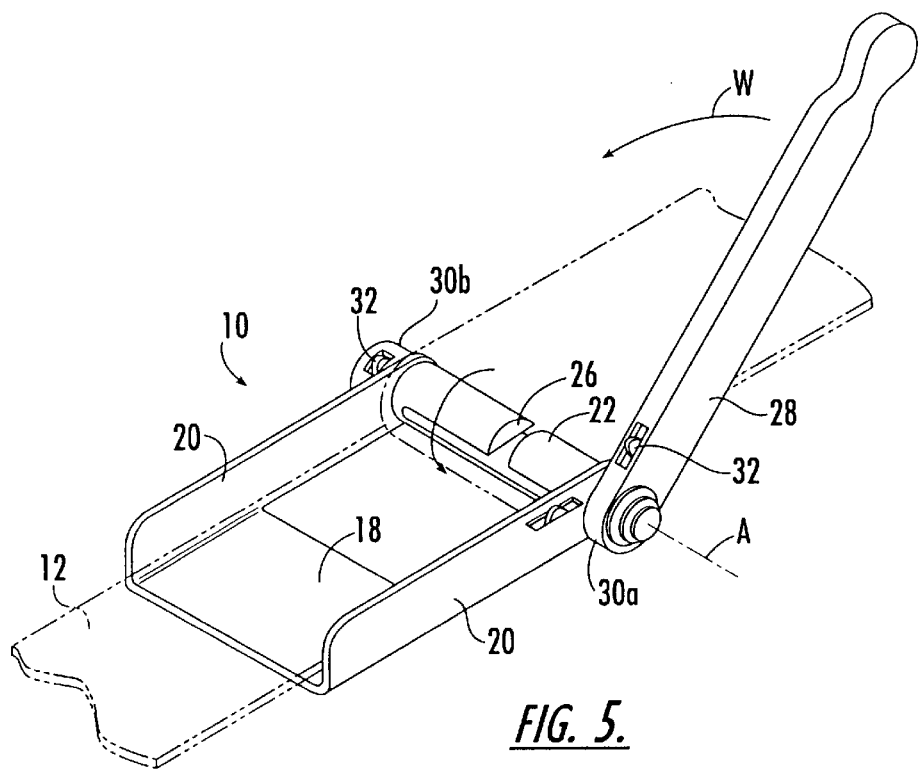
FIG. 5 is a view similar to FIG. 2 showing the shortening device in use.
Figure 6:
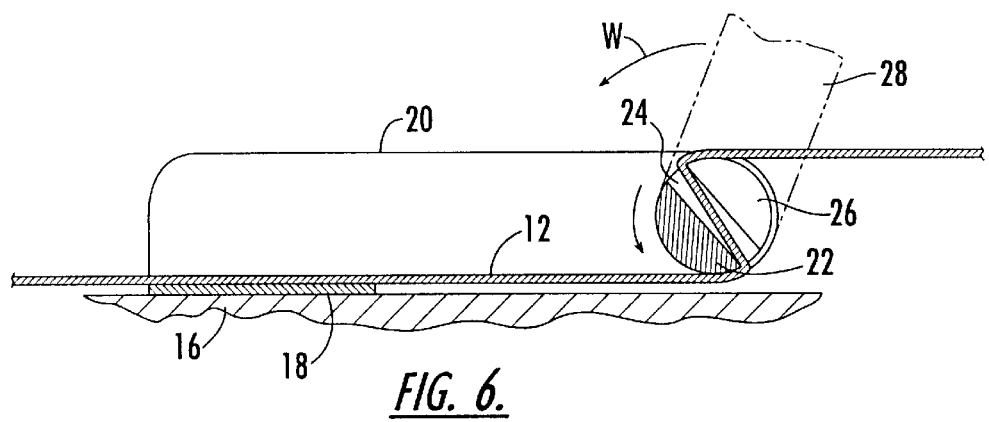
FIGS. 6 and 7 are views similar to FIG. 4 showing the belt being wound on the winding spindle.

In use, a belt 12 or other like strap or flexible element is first folded as indicated by the broken lines at 12, in FIG. 3. The folded belt is inserted into the spindle slot 24 via the entry opening 26. As shown in FIGS. 3 and 4, when the belt is thus inserted, it lies flat in the slot 24 and overlies the bottom wall 18 of the frame. The length of slot 24 is preferably somewhat greater than the belt width.

Figure 7:
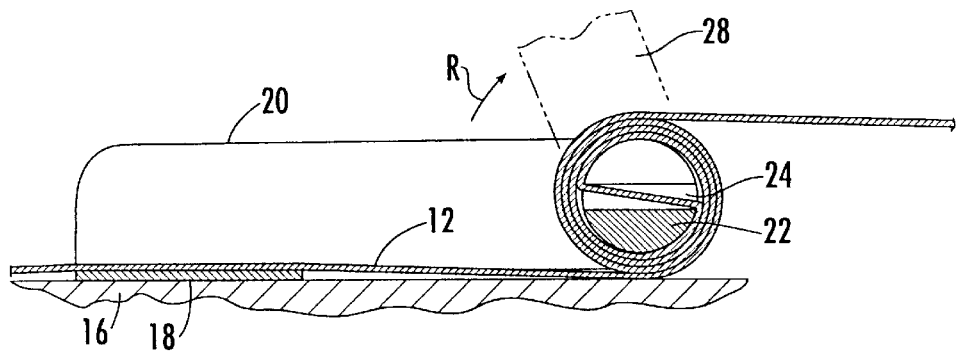

The belt 12 may then be shortened by manipulating the handle 28 to rotate the spindle 22 in the wind direction W. Frame rotation in the same direction W will be prevented by contact of the bottom wall 18 with the seat 16. Frame rotation in the opposite reset direction "R" will be resisted by contact of the bottom wall 18 with the underside of the belt. As shown in FIG. 7, continued manipulation of the handle 28 will cause the belt to wind itself around the spindle 22, thereby shortening the overall belt length and, in the environment depicted in FIG. 1, resulting in the belt being tightened. The belt may be loosened by operating the latches 32 to accommodate reverse operation of the ratchet mechanisms 30a, 30b.

In light of the foregoing, it will now be appreciated by those skilled in the art that various modifications may be made to the embodiment herein chosen for purposes of disclosure. For example, the frame configuration may be altered to include only a single side wall supporting both a cantilevered base and a cantilevered winding spindle. The winding spindle may assume various configurations and cross sections, provided that they all have a belt receiving slot or its equivalent which is accessible by an entry opening through which the belt may be admitted, typically by folding as shown in FIG. 3. Ratchet mechanisms 30a, 30b may be combined as a single unit.

It is our intention to encompass these and all other changes and modifications to the embodiment herein described which do not depart from the spirit and scope of our invention as defined by the claims appended hereto.

We claim:

1. A device for shortening a length of a flexible belt having a width and opposing edges, comprising:

a frame;

a spindle supported by said frame for rotation about an axis, said spindle including a longitudinally extending slot, having a length, a width, a first end and a second end opposite said first end, communicating with a laterally extending entry opening having a width, said entry opening being configured and dimensioned to accommodate lateral insertion of said belt into said slot; said laterally extending entry opening being positioned between said first end and said second end of said slot;

said slot and said entry opening, in combination, providing an opening in said spindle of a substantially T-shaped configuration; said spindle being rotatable about said axis in one direction and rotatable in an opposite direction thereto; and operating means for rotating said spindle to thereby wind the inserted belt thereon.

2. The device as claimed in claim 1 wherein the length of said slot is configured to be greater than the width of said belt.

3. The device as claimed in claim 1 wherein the width of said entry opening is less than the width of said slot.

4. The device as claimed in claim 1 further comprising ratchet means for accommodating rotation of said spindle in one direction and for resisting rotation of said spindle in the opposite direction.

\* \* \* \* \*